(12) United States Patent
Zhang

(10) Patent No.: US 11,825,789 B2
(45) Date of Patent: Nov. 28, 2023

(54) BOARD CONNECTOR SYSTEM AND METHOD

(71) Applicant: Dynaforge Trading, LLC, St. Paul, MN (US)

(72) Inventor: Jason Zhang, Shanghai (CN)

(73) Assignee: Dynaforge Trading LLC

( * ) Notice: Subject to any disclaimer, the term of this patent is extended or adjusted under 35 U.S.C. 154(b) by 825 days.

(21) Appl. No.: 16/546,413

(22) Filed: Aug. 21, 2019

(65) Prior Publication Data

US 2021/0051861 A1    Feb. 25, 2021

(51) Int. Cl.
| | | |
|---|---|---|
| *F16M 11/00* | (2006.01) | |
| *A01G 9/02* | (2018.01) | |
| *F16B 5/00* | (2006.01) | |
| *A01G 9/28* | (2018.01) | |

(52) U.S. Cl.
CPC ............... *A01G 9/02* (2013.01); *A01G 9/28* (2018.02); *F16B 5/004* (2013.01)

(58) Field of Classification Search
CPC .. A01G 9/28; A01G 9/02; F16B 5/004; E04B 2/76
See application file for complete search history.

(56) References Cited

U.S. PATENT DOCUMENTS

| | | | | |
|---|---|---|---|---|
| 2,345,650 A | * | 4/1944 | Attwood | B62D 33/044 411/105 |
| 3,043,408 A | * | 7/1962 | Attwood | E04C 3/07 104/107 |
| 3,094,197 A | * | 6/1963 | Attwood | A47B 96/1408 52/843 |
| 3,712,005 A | | 1/1973 | Eschbach et al. | |
| 4,964,256 A | * | 10/1990 | McCracken | E04G 11/50 29/897.34 |
| 5,118,069 A | * | 6/1992 | Muhlethaler | F16F 3/0873 248/68.1 |
| 5,480,117 A | | 1/1996 | Fleming, III | |
| 5,509,714 A | * | 4/1996 | Schmidt | B62D 33/046 52/537 |
| 5,634,663 A | * | 6/1997 | Krupp | B62D 21/02 296/29 |

(Continued)

FOREIGN PATENT DOCUMENTS

| | | |
|---|---|---|
| CN | 213451164 U | 6/2021 |
| WO | WO 2021034846 A1 | 2/2021 |

OTHER PUBLICATIONS

Frame It All, "Weathered Wood Raised Garden Bed", Simple Modular Gardens, Raised Garden Beds, retrieved on Aug. 16, 2019, pp. 22, available at: http://www.frameitall.com/raised-beds-system.html.

(Continued)

*Primary Examiner* — Amy J. Sterling
(74) *Attorney, Agent, or Firm* — Jose Cherson Weissbrot

(57) ABSTRACT

A connector system and method comprising a coupling with 3 walls defining a cavity. Disposed on the first side wall and second side wall are lips protruding into the cavity, such that a grooved board inserted into the cavity is in contact with the lips and back wall. Disposed on the walls are mounting holes, such that other apparatuses may be mounted to the mounting holes. The couplings may be mounted on other identical couplings or on couplings of different heights.

21 Claims, 18 Drawing Sheets

(56) References Cited

U.S. PATENT DOCUMENTS

| | | | |
|---|---|---|---|
| 6,398,260 B1* | 6/2002 | Rinehart | E04C 3/09 |
| | | | 296/204 |
| 6,601,831 B2 | 8/2003 | Erwin | |
| 8,303,017 B2* | 11/2012 | LeBlanc | B62D 27/06 |
| | | | 52/716.5 |
| 8,714,495 B2* | 5/2014 | Myers | F16B 7/0493 |
| | | | 248/300 |
| 8,955,251 B2 | 2/2015 | Topping | |
| 9,723,786 B2 | 8/2017 | Brummelhuis | |
| D826,695 S * | 8/2018 | Bolster | E04G 11/50 |
| | | | D8/354 |
| 10,876,555 B2* | 12/2020 | Korhonen | E04F 13/0883 |
| 2004/0187400 A1 | 9/2004 | Anderson et al. | |
| 2007/0248793 A1* | 10/2007 | Herb | B21B 27/00 |
| | | | 428/156 |
| 2011/0169386 A1 | 7/2011 | Hardy et al. | |
| 2012/0042619 A1 | 2/2012 | Lohrentz et al. | |
| 2012/0144765 A1 | 6/2012 | LeBlang | |
| 2014/0290136 A1 | 10/2014 | Vaughn | |
| 2019/0242111 A1 | 8/2019 | LeBlang | |
| 2019/0242129 A1 | 8/2019 | LeBlang | |

OTHER PUBLICATIONS

Atkore International, Inc., "Unistrut Defender", Corrosion-resistant Product Line, New Product, 2016, p. 20, available at: https://www.unistrut.us/assets/unistrut/Unistrut%20Defender%20Catalog/.

Global Sources, "Custom Stainless Steel/Brass/Aluminum U-shaped Brackets in Stamping Manufacturer", Reliable exporters: find them and meet them, retrieved on Aug. 16, 2019, pp. 3, available at: https://www.globalsources.com/gsol/I/Metal-stamping/p/sm/1086087305.htm#1086087305.

Kuhlmann, Nicholas, Reply to Written Opinion of the International Searching Authority, Int'l App. No. PCT/US2020/046836, dated Jun. 18, 2021, pp. 1-6, IPEA/US, Alexandria, VA.

Dynaforge Trading, LLC, Everbloom catalog 2019, 8 pages, distributed along with product display at National Hardware Show on May 9, 2019 in Las Vegas, NV; at National Lawn and Garden Show on Jun. 9, 2019 in St. Louis, MO; and at Independent Garden Center trade show on Aug. 13, 2019 in Chicago, IL.

Dynaforge Trading, LLC, website www.everbloom-garden.com (live approx. May 14, 2019), 2 pgs.

International Preliminary Report on Patentability, PCT/US2020/046836, dated Nov. 10, 2021, 10 pgs.

HALFEN Mounting Channels & HALFEN T-Bolts website, 2 pgs. Link: https://www.halfen.com/us/2774/product-ranges/construction/mounting-systems/halfen-mounting-channels-and-halfen-t-bolts/introduction/.

Blaine R. Copenheaver, International Search Report, Int'l App. No. PCT/US2020/046836, dated Oct. 28, 2020, pp. 1-2, ISA/US, Alexandria, VA.

Blaine R. Copenheaver, Written Opinion of the International Searching Authority, Int'l App. No. PCT/US2020/046836, dated Oct. 28, 2020, pp. 1-8, ISA/US, Alexandria, VA.

Gardener's Supply Company "Deep Root Cedar Raised Bed, 4' Wide" https://www.gardeners.com/buy/deep-root-cedar-raised-beds-4ft/8587809VS.html#/start=1 retrieved Oct. 9, 2019 Burlington, VT.

Cirtex Residential "Surewall" https://cirtexresidential.co.nz/cirtex-products/retaining-walls/surewall retrieved Oct. 9, 2019 Thames, New Zealand.

* cited by examiner

BOARD CONNECTOR SYSTEM AND METHOD

TECHNICAL FIELD

The present disclosure relates to a connector system for securing boards, wherein the system discloses couplings which may be attached to other couplings in multiple configurations, and the couplings bind to the boards using lips. The present disclosure also discloses mounting holes for use in attaching other apparatuses to the couplings, and for aligning the couplings.

BACKGROUND

Traditional board connectors are not suitable to be attached to other board connectors in multiple configurations. By binding connectors in multiple configurations, users may efficiently assemble items utilizing connectors and boards therein such as garden beds. Traditional board connectors also do not include mounting holes such that accessories may be connected to the connector. Traditional connectors also do not utilize lips to bind the boards within the connector, thus allowing for a wider variety of usable boards to be disposed within the connector.

SUMMARY

The present disclosure describes a board connector system. The system may be used on flower beds or any other suitable application. The connector system comprises a coupling with a first side wall, back wall, and second side wall, the three walls defining a cavity. The first and second side walls are parallel, the back wall is perpendicular to the first and second walls. The first and second walls include a lip protruding into the cavity defined by the walls.

The present disclosure describes a board or lattice wall disposed in the cavity of the coupling. The board touches the lips disposed on the walls such that the board does not contact the first or second walls, but it does contact the back wall. The board includes a groove to receive the lip, and secure the board within the cavity. The system of grooves and the lips is called a "Groove Lock"™ system.

The couplings include a plurality of mounting holes, such that other accessories may be mounted in the mounting holes. The accessories, including garden accessories such as a pot holder or shelf support may be mounted by means of a bolt and nut. The mounting holes on the couplings align when two or more couplings are mounted together. The head of the bolt may be disposed in the cavity of the coupling in the gap between the board or lattice and the coupling wall.

The couplings may be mounted to other couplings that are either identical or of different heights. The couplings may be mounted together such that the cavities form an angle of approximately 90 degrees or are in a straight line. The couplings may be mounted to third couplings such that the 3 couplings together form a "T" shape. The couplings may be mounted to form other desirable configurations for garden beds.

Boards may be disposed in the couplings such that the boards are stacked on top of either other, or such that other shorter couplings are mounted to form beds of different heights. Garden fence lattice systems may also be disposed within the cavity.

Furthermore, the couplings are of different lengths such they can be used to configure, either raised or elevated garden beds, retaining wall systems, fencing systems, or railing systems. Raised garden beds may be disposed on the ground or other surface, elevated garden beds are elevated from the ground as further described below.

DETAILED DESCRIPTION

The present disclosure describes a board connector system that allows for boards or other materials disposed within couplings. The present disclosure also relates to a system of configuring couplings in multiple orientations, such that the boards within the couplings can be configured to make garden beds of different shapes, heights, and sizes. Also, the present invention allows for other items to be attached to the board couplings.

The coupling may be configured with a first, second, and back wall to define a cavity. In one embodiment, the first side wall, second side wall, and back wall are mounted to one another at an angle of approximately 90 degrees. In one embodiment, the first side wall is mounted to the back wall, and the back wall is mounted to the second side wall. The walls are each of equal length. The first side wall is parallel to the second side wall. The first side wall and second side wall are perpendicular to the back wall.

In one embodiment, each of the first side wall and second side wall include a rounded lip protruding inwardly into the cavity defined by the walls. When a board, or other object is disposed in the cavity defined by the walls, the lip will make contact with the board such that the board is not in direct contact with the first side wall and second side wall of the coupling, but is in contact with the back wall. The interaction between a board and the walls of the coupling is described further below.

In one embodiment, the coupling may be mounted to other identical couplings. In one embodiment, the first wall of the first coupling is mounted on the back wall of an identical coupling. In another embodiment, the back wall of the first coupling is mounted on the back wall of the second coupling. In another embodiment a third coupling is mounted to the second coupling to make a "T" junction to join 3 boards. Thus, the coupling may be used to configure multiple different orientations of boards for the production of flower boxes. Other uses include, sand boxes and related usages.

In one embodiment the couplings are made of steel. A person of skill in the art can substitute similar materials such as other metals or alloys.

In one embodiment, the board includes grooves to receive the rounded lips of the first side wall and second side wall. The lip fits into the groove in the boards in order to secure the board. The relationship between the lips and groove of the board is a tongue and groove connection, and enables a secure connection to the board. The system of grooves and the lips is called a "Groove Lock"™ system.

In one embodiment, the boards are made of plastic composite materials. A person of skill in the art can substitute similar materials such as wood or wood plastic composite materials.

Figure 1:
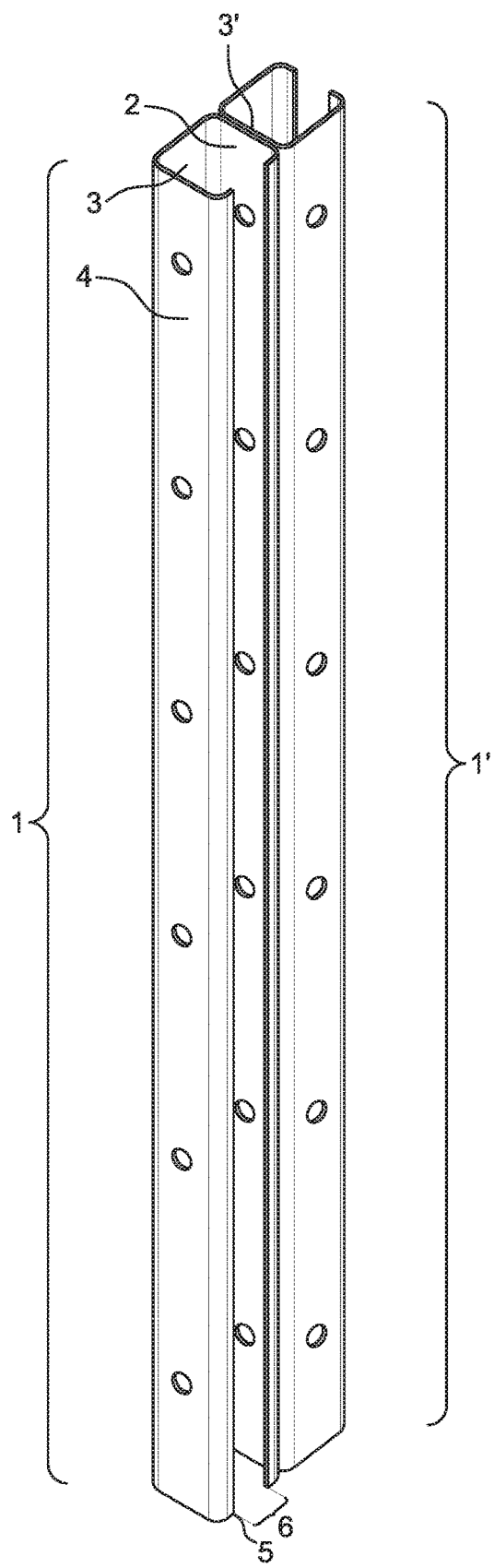
FIG. 1 is a slightly elevated perspective view of two couplings joined together such that the openings form a right angle.

FIG. 1 shows an example embodiment with two identical couplings. The first coupling [1] includes a first side wall [2] a back wall [3] a second side wall [4]. In one embodiment, a curved joint connects the first side wall [2] to the back wall [3] and a second curved joint connects the back wall [3] to the second side wall [4] such that the first side wall [2] and second side wall [4] are parallel, and the back wall [3] is perpendicular to the first and second side wall. [1, 4] In another embodiment, the joints are 90 degrees.

The first side wall [2] and second side wall [4] include a rounded lip [5] protruding into the cavity [6] defined by the walls. In the illustrated embodiment the first side wall [2] is mounted on the back wall [3'] of an identical second coupling [1']. Thus, when boards are inserted into the couplings, they form a connection at a 90 degree angle.

Figure 2:
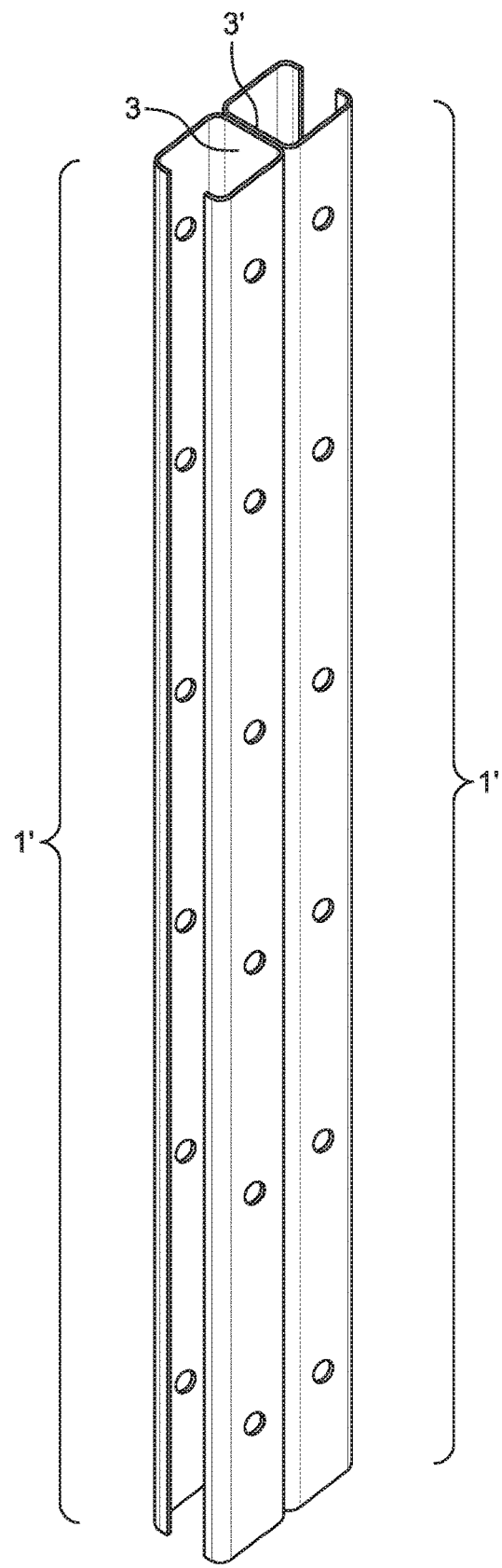
FIG. 2 is a slightly elevated perspective view of two couplings joined together such that the openings are oriented 180 degrees apart.

FIG. 2 shows an example embodiment wherein the back wall [3] of the first coupling [1] is joined to the back wall [3'] of a second identical coupling [1']. Thus, when boards are inserted into the couplings, they form a connection of 180 degrees or end to end.

Figure 3:
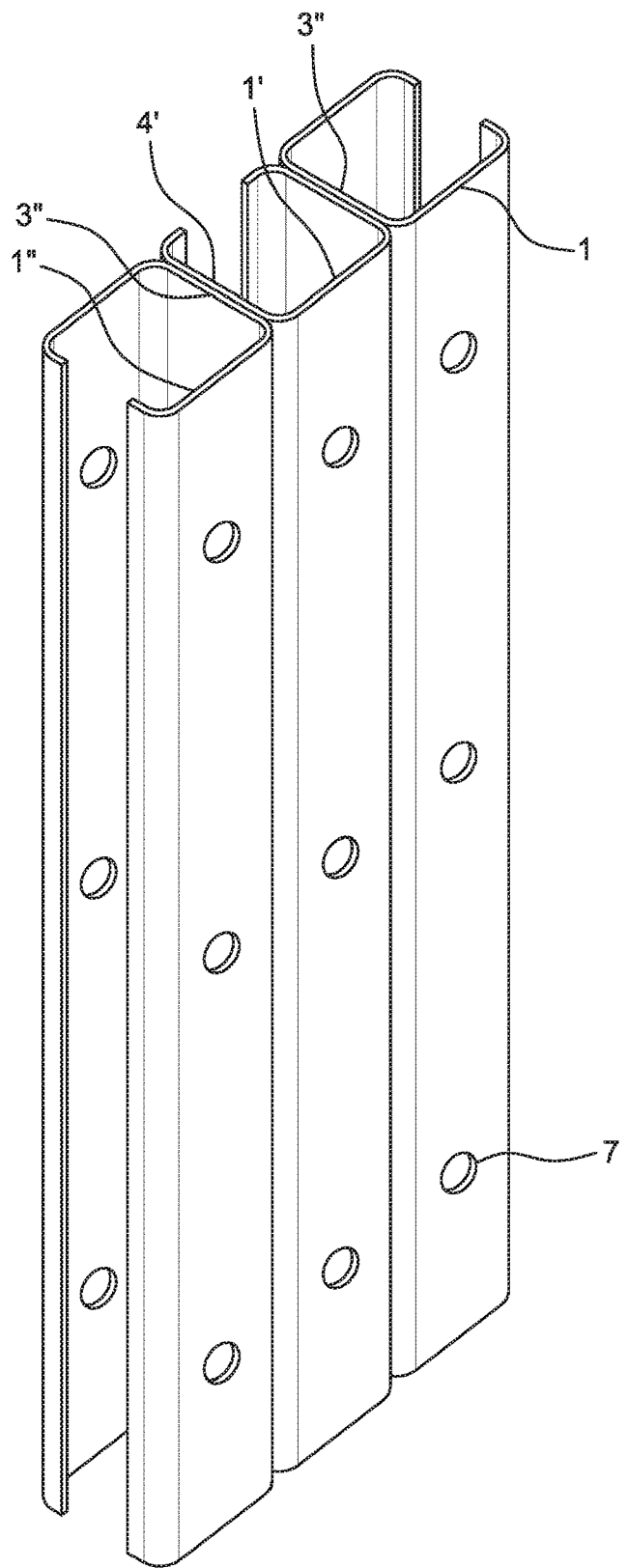
FIG. 3 is a slightly elevated perspective view of three couplings joined together.

FIG. 3 shows an example embodiment wherein a third identical coupling [1"] with a back wall [3"] is mounted to the second side wall [4'] of the second coupling [1']. Thus when boards are inserted into the couplings they form a "T" shape.

In one embodiment the walls of the couplings include a plurality of mounting holes [7]. Mounting holes provide several advantages. During fabrication of the coupling, the mounting holes provide an efficient way to measure the couplings. In addition, when multiple couplings are mounted together, the mounting holes [7] align.

Figure 4:
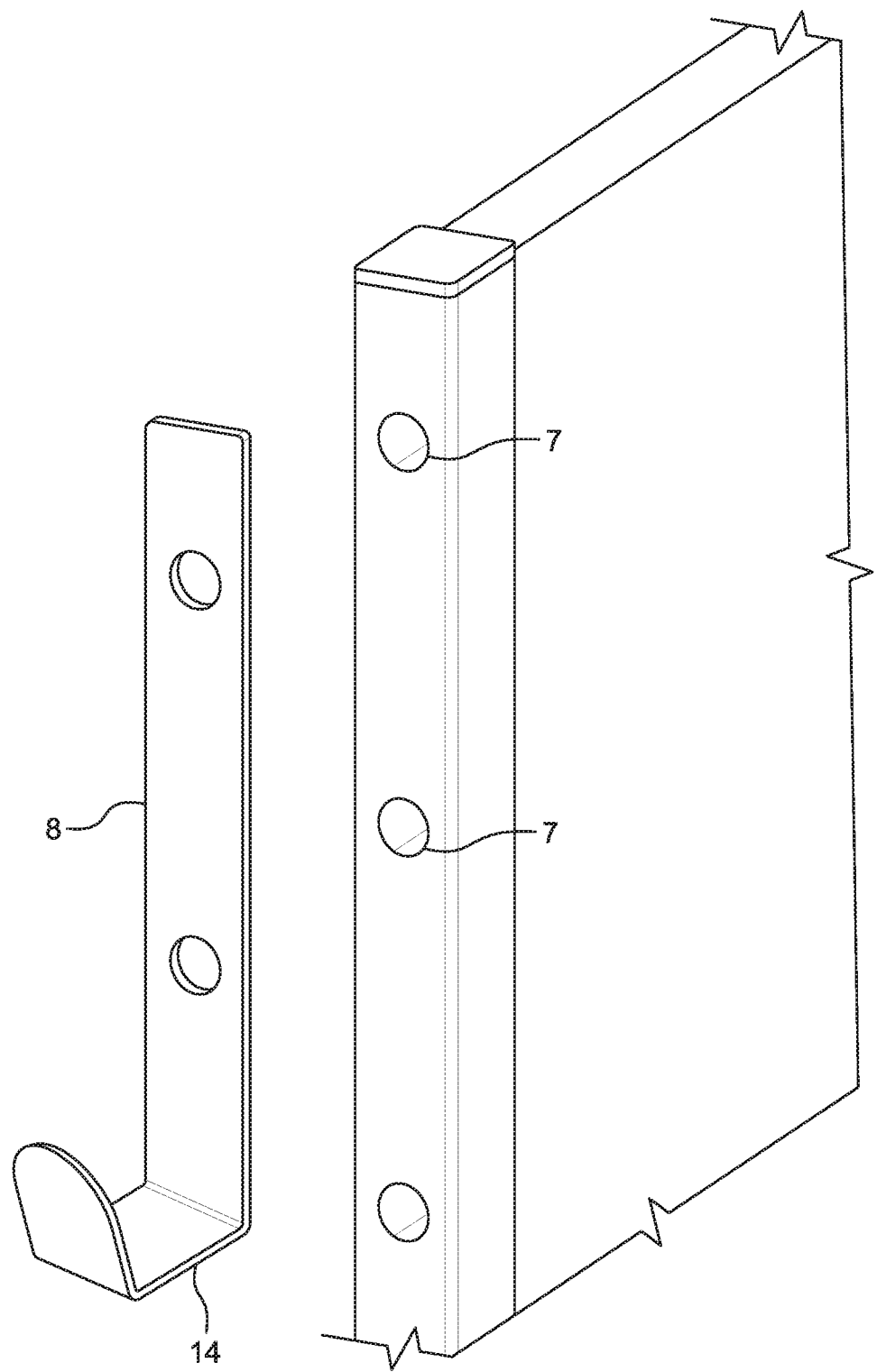
FIG. 4 is a perspective view of a garden apparatus un-mounted to a coupling

FIG. 4 shows an example embodiment wherein a garden apparatus [8] is shown un-mounted the mounting holes [7].

In the example embodiment, the garden apparatus comprises a pot holder [14]. In another embodiment the garden apparatus [8] is a utility hook. In yet another embodiment, the garden apparatus [8] is a rope and ground stake used to secure the fully completed structure.

Figure 5:
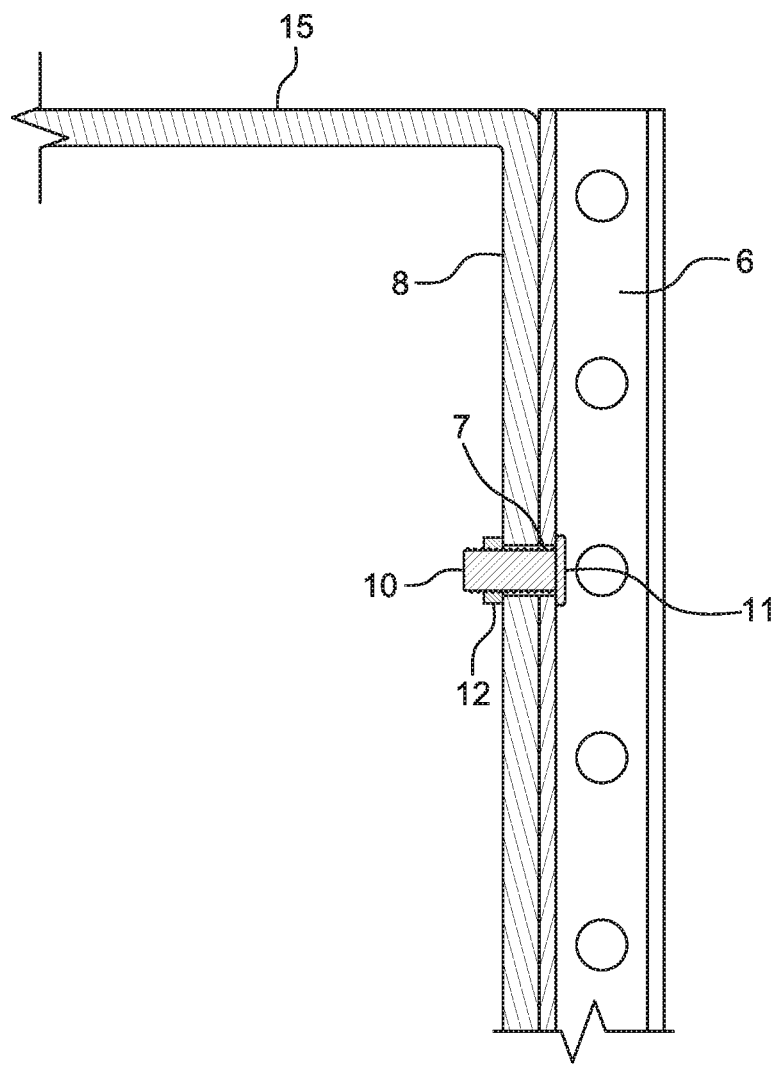
FIG. 5 is a cross section view of a garden apparatus mounted to a coupling.

FIG. 5 shows an example embodiment where a garden apparatus [8] is shown mounted to the mounting holes. In the illustrated embodiment, a bolt [10] is configured to mount the garden apparatus [8]. In this embodiment, the bolt [10] is made of metal. The head of the bolt [11] is disposed within the cavity [6] and extends out through the mounting hole [7] into the garden apparatus [8]. A nut [12] is configured to secure the garden apparatus [8]. In the illustrated embodiment, the garden apparatus comprises a shelf support [15]. The shelf support [15] is configured to put a shelf on (not pictured). One skilled in the art will realize other items that may be attached to the coupling via the mounting holes.

Figure 6:
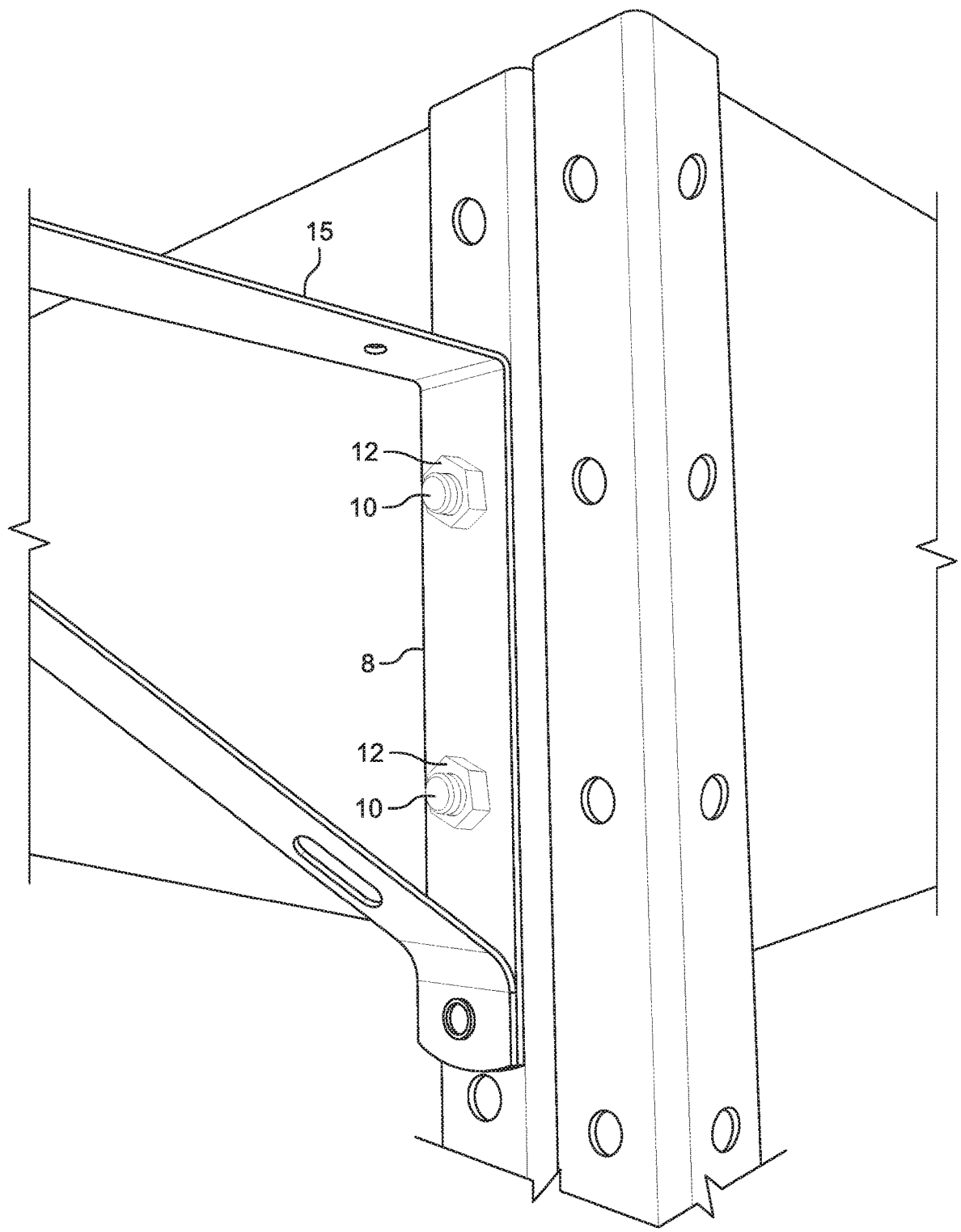
FIG. 6 is a perspective view of a garden apparatus mounted to a coupling.

FIG. 6 shows an example embodiment wherein a shelf support [15] comprises the garden apparatus [8] and is mounted on the coupling. The shelf support is mounted through the mounting holes, [not pictured], by means of a bolt [10] and nut [12].

Figure 7:
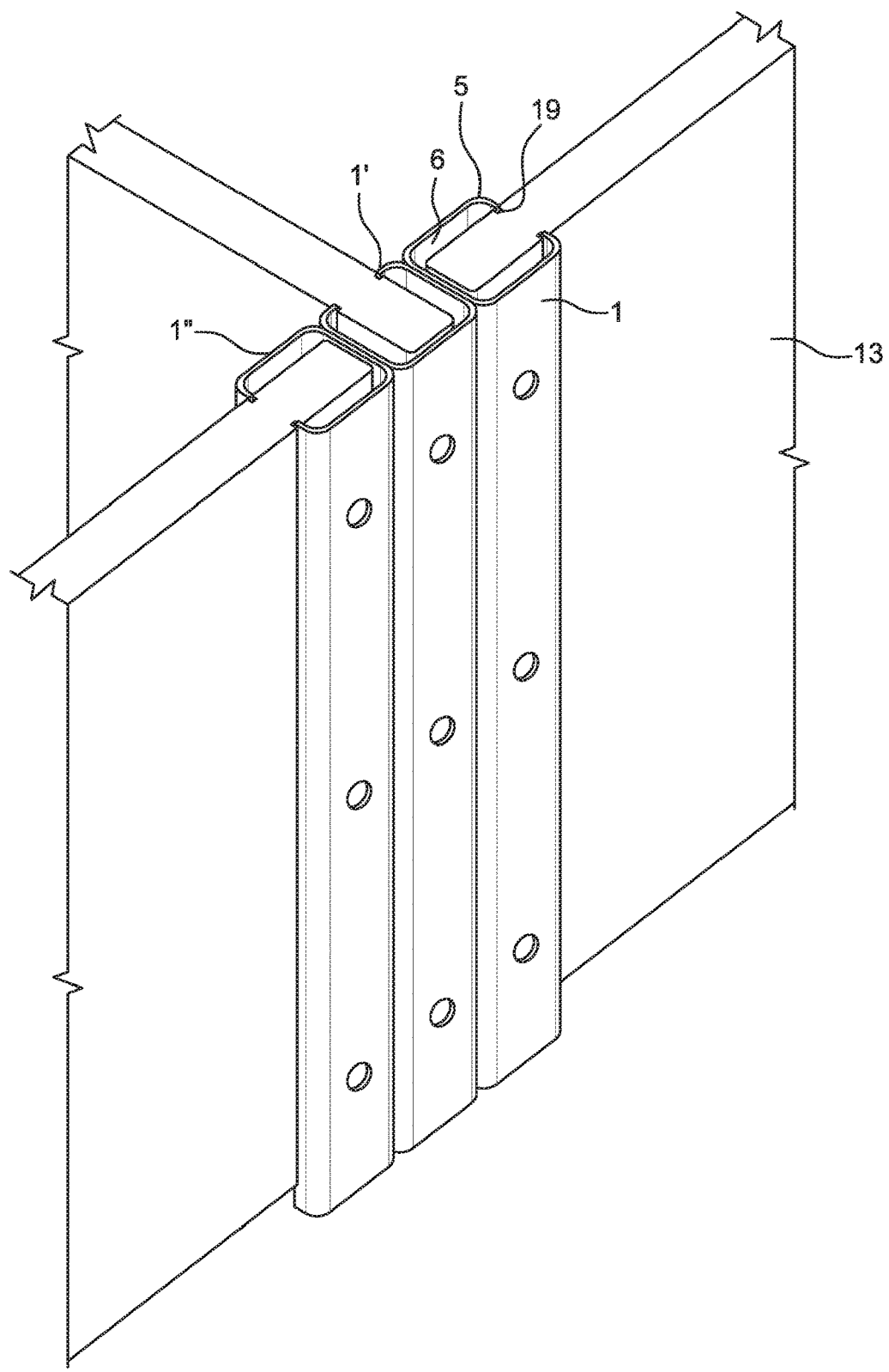
FIG. 7 is a perspective view of three couplings mounted together, with boards disposed in each coupling.

FIG. 7 shows an example embodiment wherein a board [13] is disposed in the cavity [6] of a first coupling [1]. The board grooves [19] receive the rounded lip [5]. In the illustrated embodiment, the first coupling is mounted to a second identical coupling [1'], said second coupling is mounted to a third identical coupling [1"].

Figure 8:
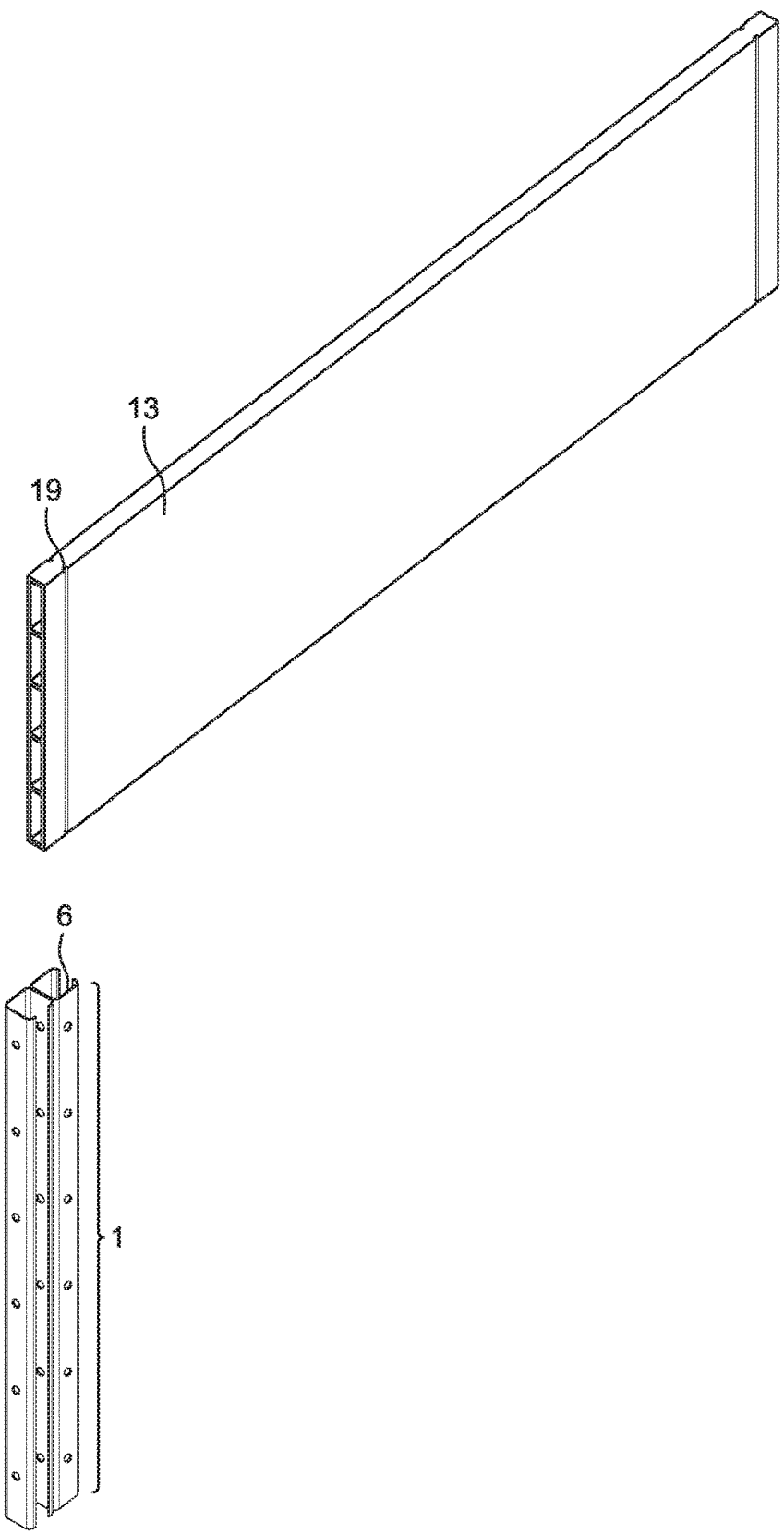
FIG. 8 is a perspective view of a board disposed outside of the coupling, said board including grooves.

FIG. 8 shows an example embodiment wherein a board [13] is disposed outside of the cavity [6] of the first coupling [1]. The board grooves [19] are visible on the board [13].

Figure 9:
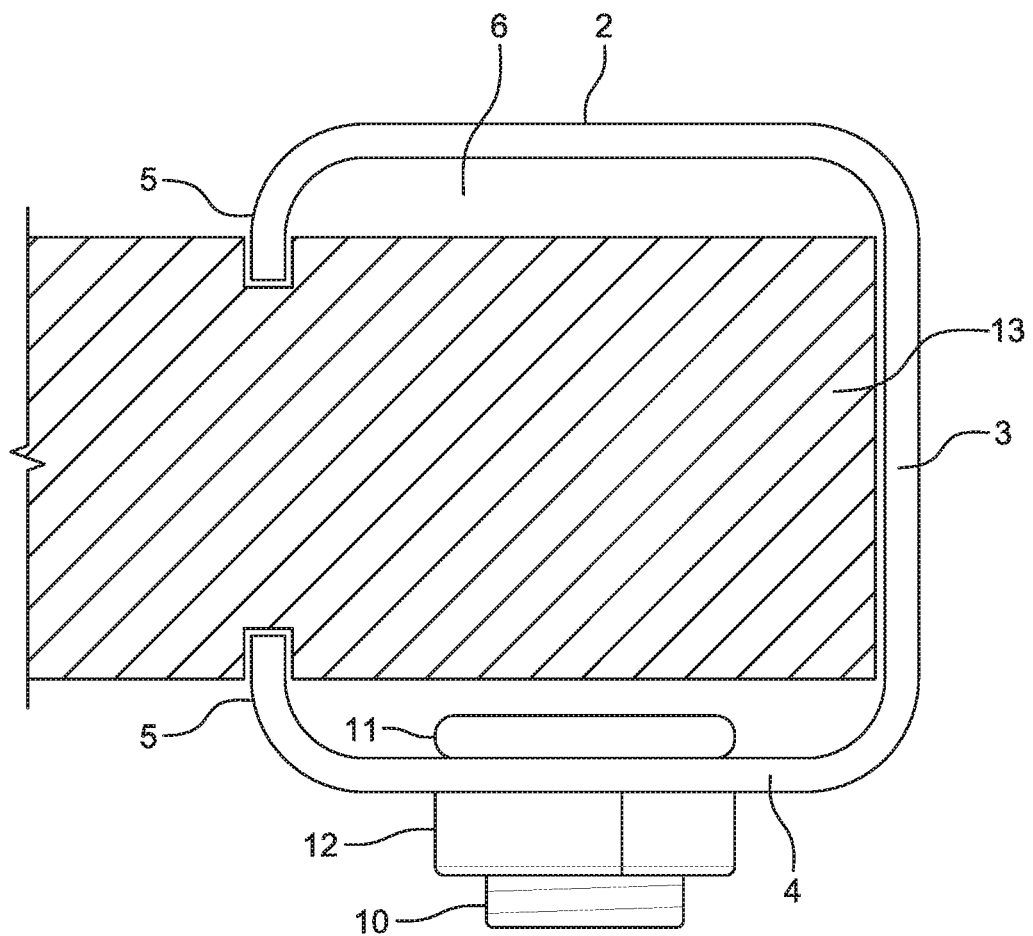
FIG. 9 is a top plan view of the board disposed within the coupling with a bolt, wherein the bolt head is disposed in the cavity between the board and coupling wall.

As shown an embodiment in FIG. 9, the board [13] when disposed in the cavity [6] is not in contact with the first side wall [2], or second side wall [4] of the coupling. Rather it is in contact with the rounded lip [5] and back wall [3]. In this configuration the coupling [1] can successfully grip boards [13] of different thickness by biting into the grooves.

It is common for boards to have different standardized thicknesses internationally such as 20 millimeters or ¾ of an inch. In the process of manufacturing, the thickness can vary from 18 to 22 millimeters. The lips [5] allow for increased variation of boards, due to the amount of flexibility in the coupling [1] and the thickness of the board, and the board grooves. In one embodiment the lips [5] flex approximately 1 millimeter to fit different board sizes, and the variations in board thickness during manufacturing. In one embodiment, the cavity [6] is approximately 16 millimeters thick. The cavity [6] can expand to fit boards [13] from approximately 18 millimeters in thickness up to 22 millimeters in thickness, wherein the boards have grooves such that the thickness at the groove is approximately 16 millimeters.

FIG. 9 also shows an embodiment wherein the screw head [11] disposed within the cavity [6] between the board and coupling. Thus when a garden apparatus [8] is mounted the screw head is disposed within the cavity [6] and the screw [10] passes through the mounting hole [7] through the garden apparatus [7] and is secured by a nut [12] as shown in FIG. 6.

Figure 10:
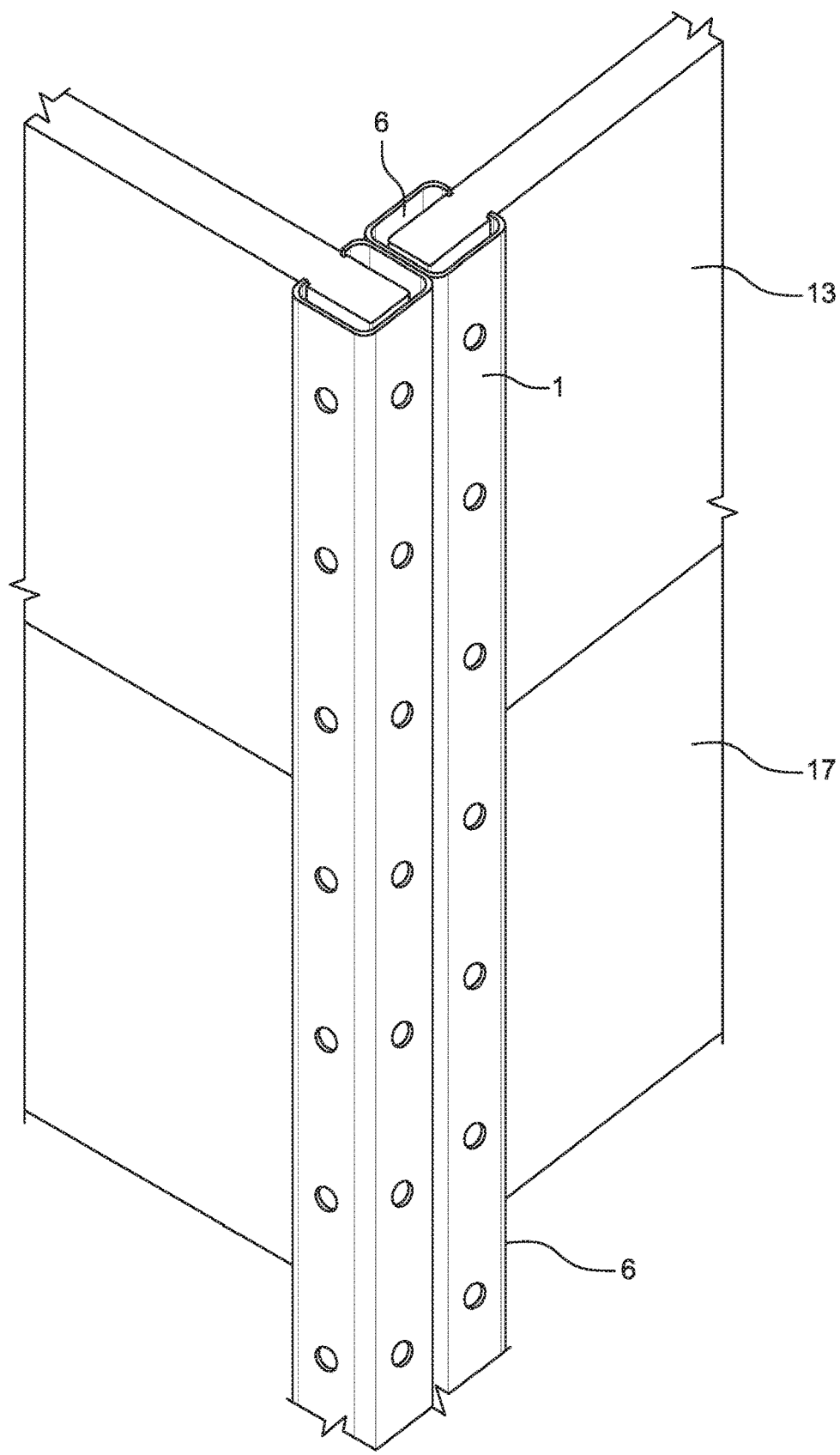
FIG. 10 is a perspective view of two couplings mounted together, with two boards mounted in each coupling.

FIG. 10 shows an example embodiment wherein the board [13] is disposed inside the cavity [6] of the first coupling [1]. Additionally a second board [17] is disposed beneath the board [13] within the cavity [6].

Figure 11:
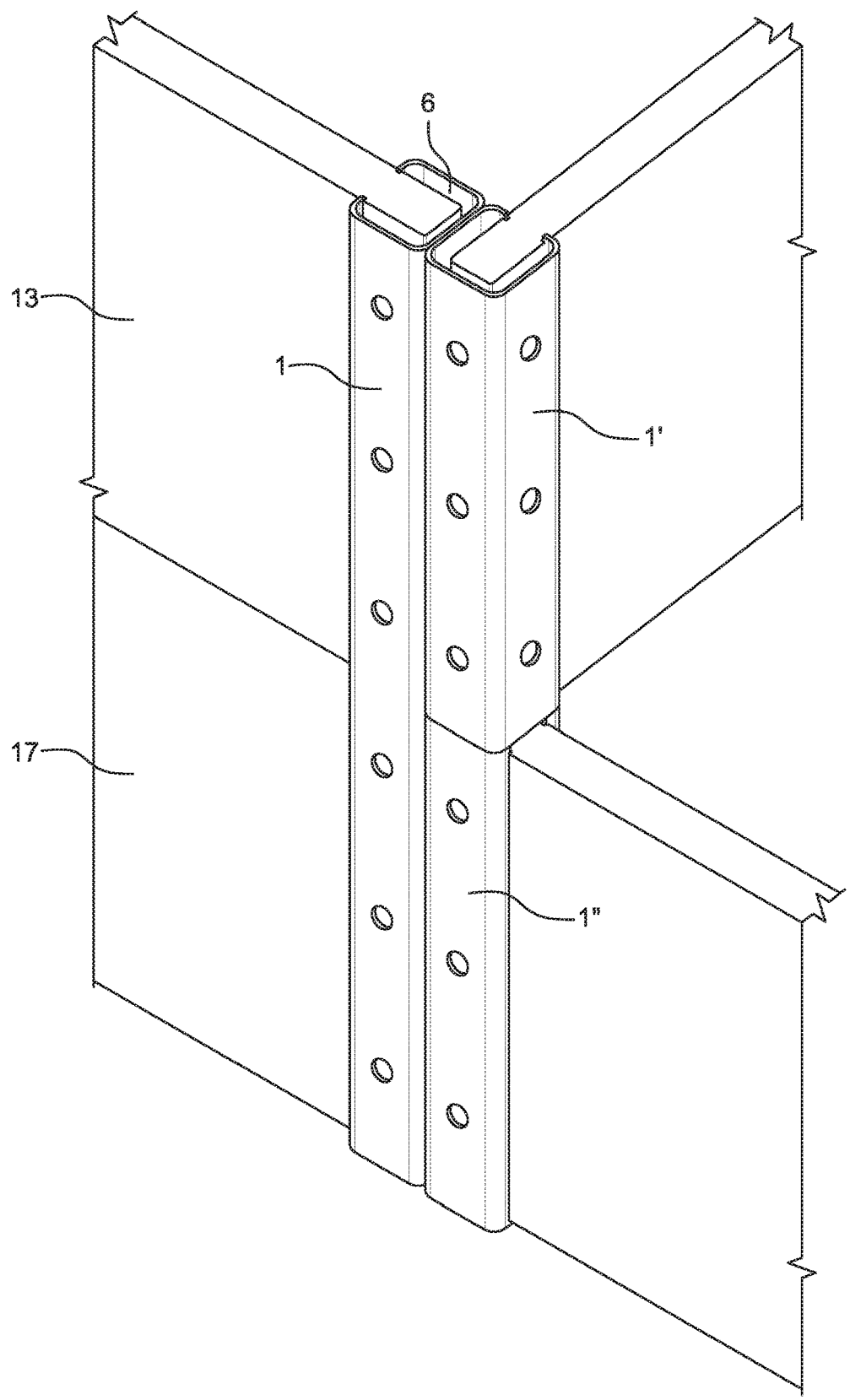
FIG. 11 is a slightly elevated perspective view of three couplings joined together, with one coupling at a different height than the other two.

FIG. 11 shows an example embodiment wherein a board [13] and second board [17] are disposed within the cavity [6]. A third coupling of different height [1"] is mounted to the second coupling [1'] and first coupling [1].

Figure 12A:
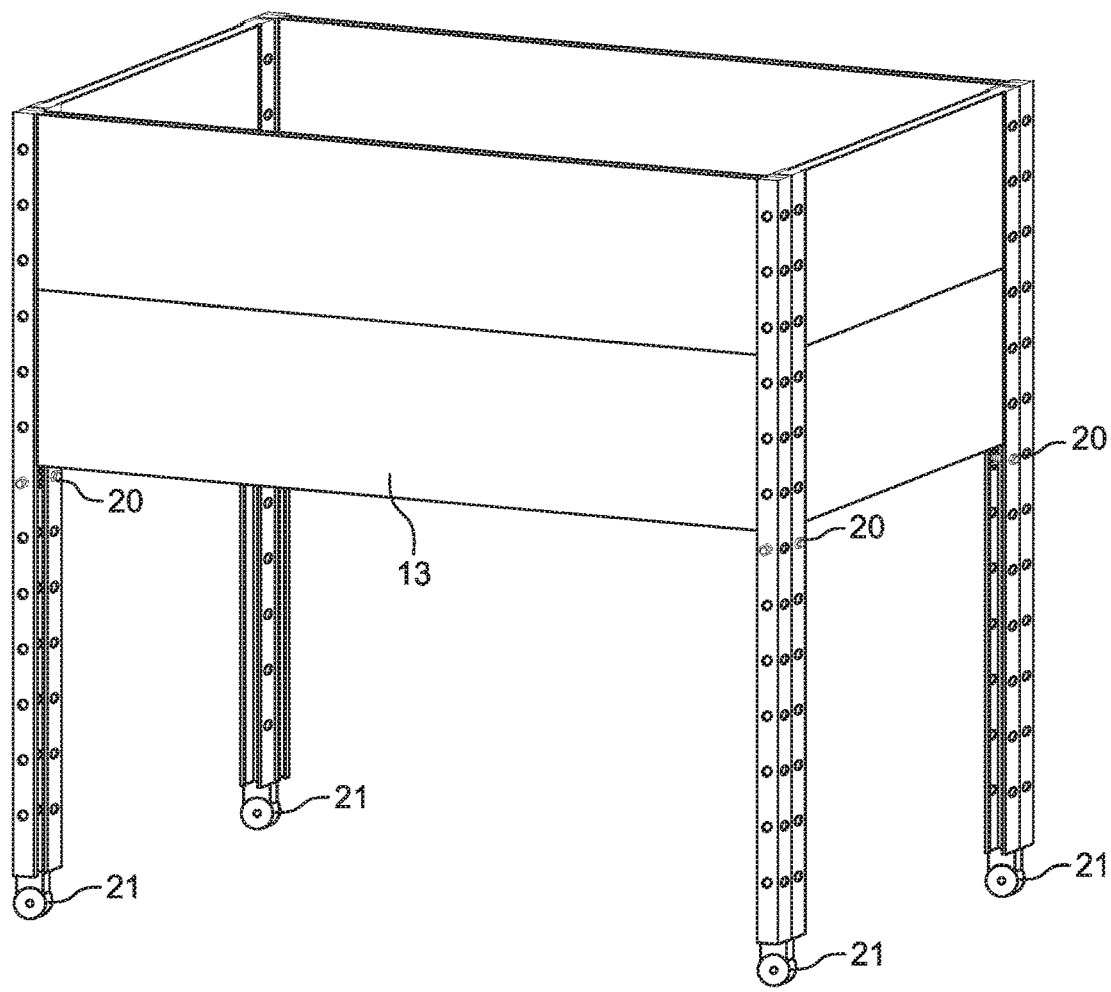
FIG. 12A is a perspective view of an elevated garden bed.

FIG. 12A shows an example embodiment with an elevated garden bed. A securing mechanism [20] is disposed on the coupling, such that the board [13] is elevated. In the illustrated embodiment the securing mechanism comprises a bolt, brace, and securing nut.

The end of the coupling distal to the board includes caster wheels [21] such that the elevated garden bed may be wheeled.

Figure 12B:
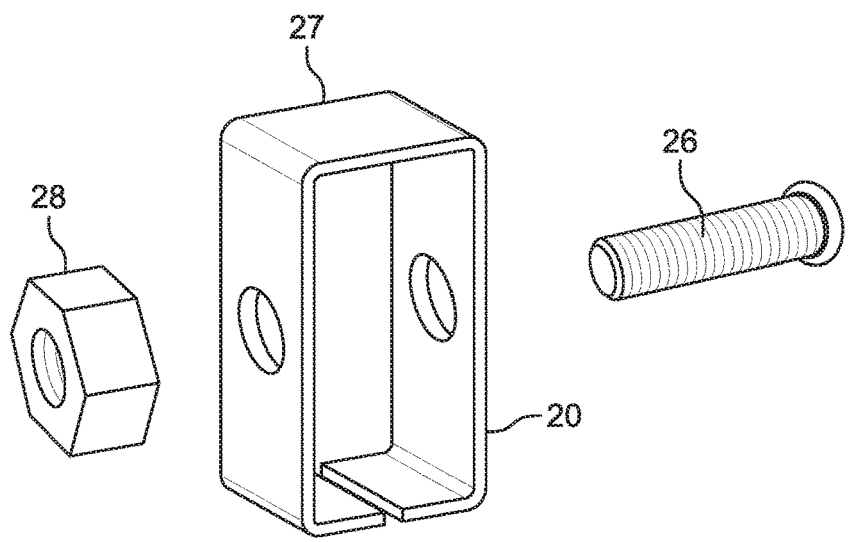
FIG. 12B is a perspective view of a securing mechanism.

FIG. 12B includes a perspective view of an embodiment of the securing mechanism [20], including a bolt [26], brace [27] and securing nut [28]. In one embodiment, the bolt [26] is inserted through the mounting hole [7], through the brace [27] which is disposed within the cavity [6], and out the mounting hole [7] located on the wall opposite. The securing nut [28] is then screwed on the bolt protruding from the opposing mounting hole [7].

Figure 13:
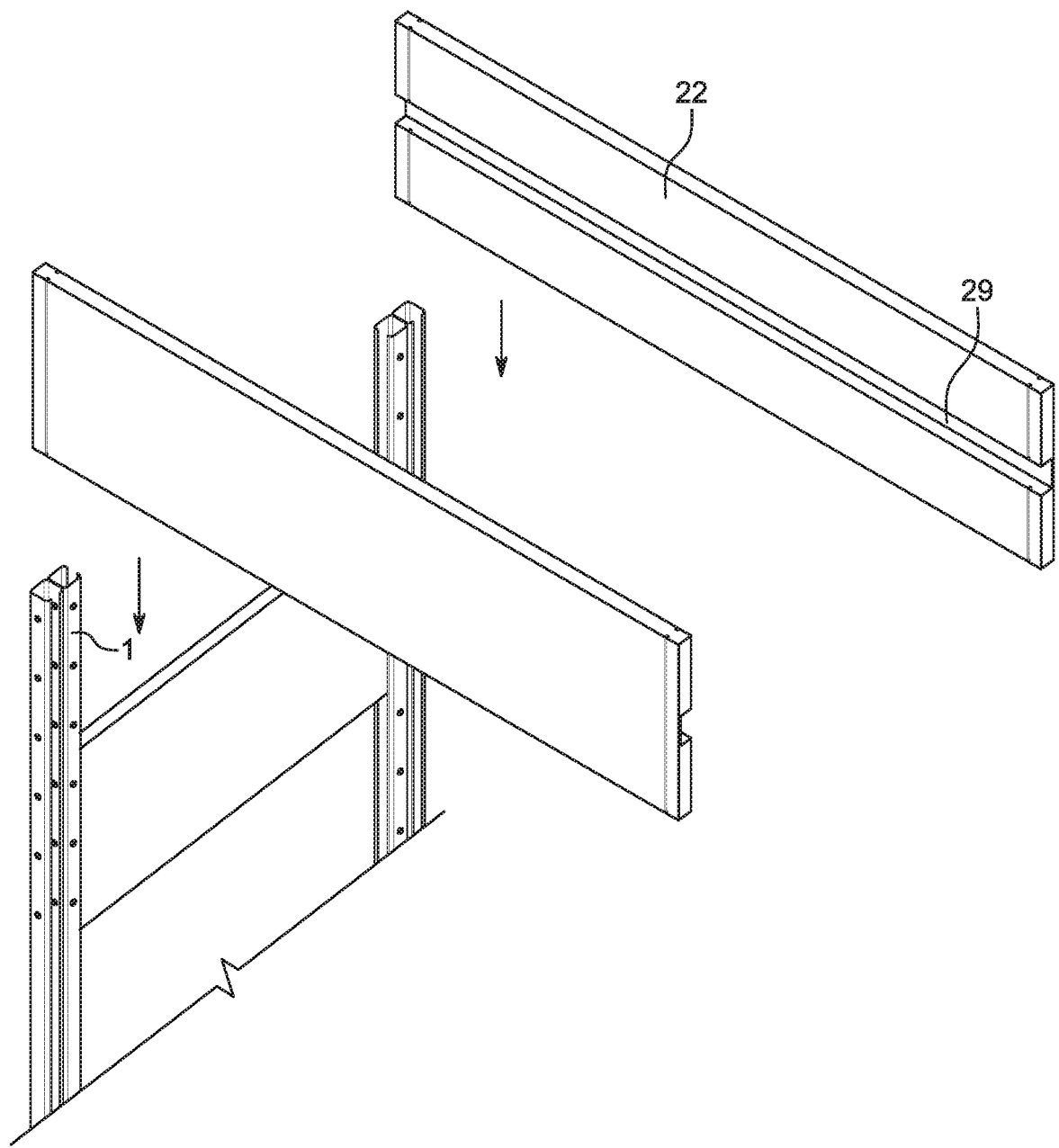
FIG. 13 is a perspective view of two slotted boards disposed above two couplings.

FIG. 13 shows two slotted boards [22] configured to receive floor boards [23] (not pictured). In this embodiment, each slotted board [22] is shown above the coupling [1] and not within the cavity [6] such that the slotted portion [29] of the slotted boards may be seen.

Figure 14:
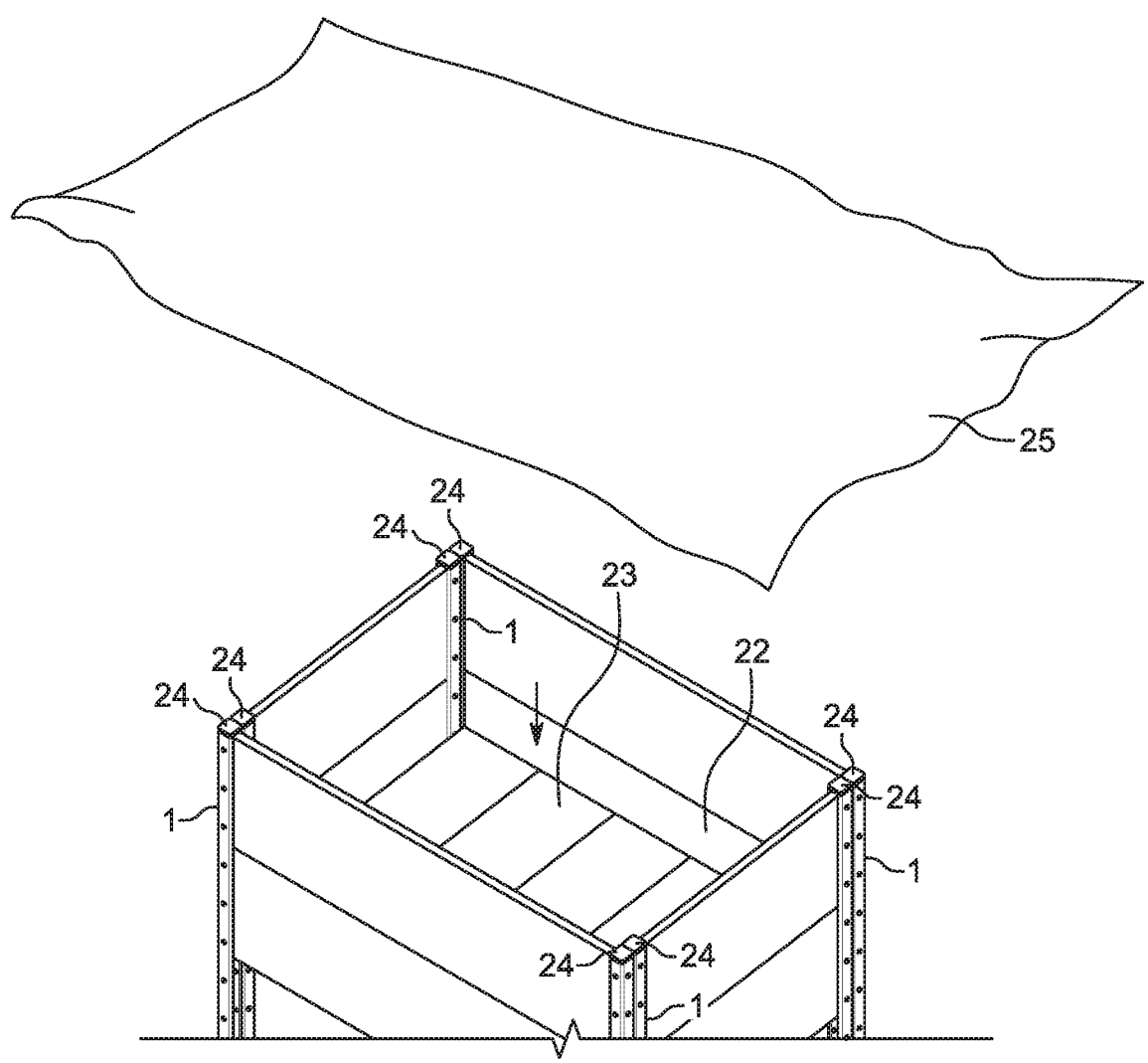
FIG. 14 is a slightly elevated perspective view of an elevated garden bed showing floor boards, slotted boards, boards, end caps, and a liner.

FIG. 14 shows an elevated garden bed with end caps [24] disposed on the coupling [1]. Floor boards [23] are disposed within the slotted portion (not pictured) of the slotted boards [22]. A liner [25] is shown disposed above the floor boards [23]. In another embodiment, the liner [25] is disposed on the floor boards [23].

Figure 15:
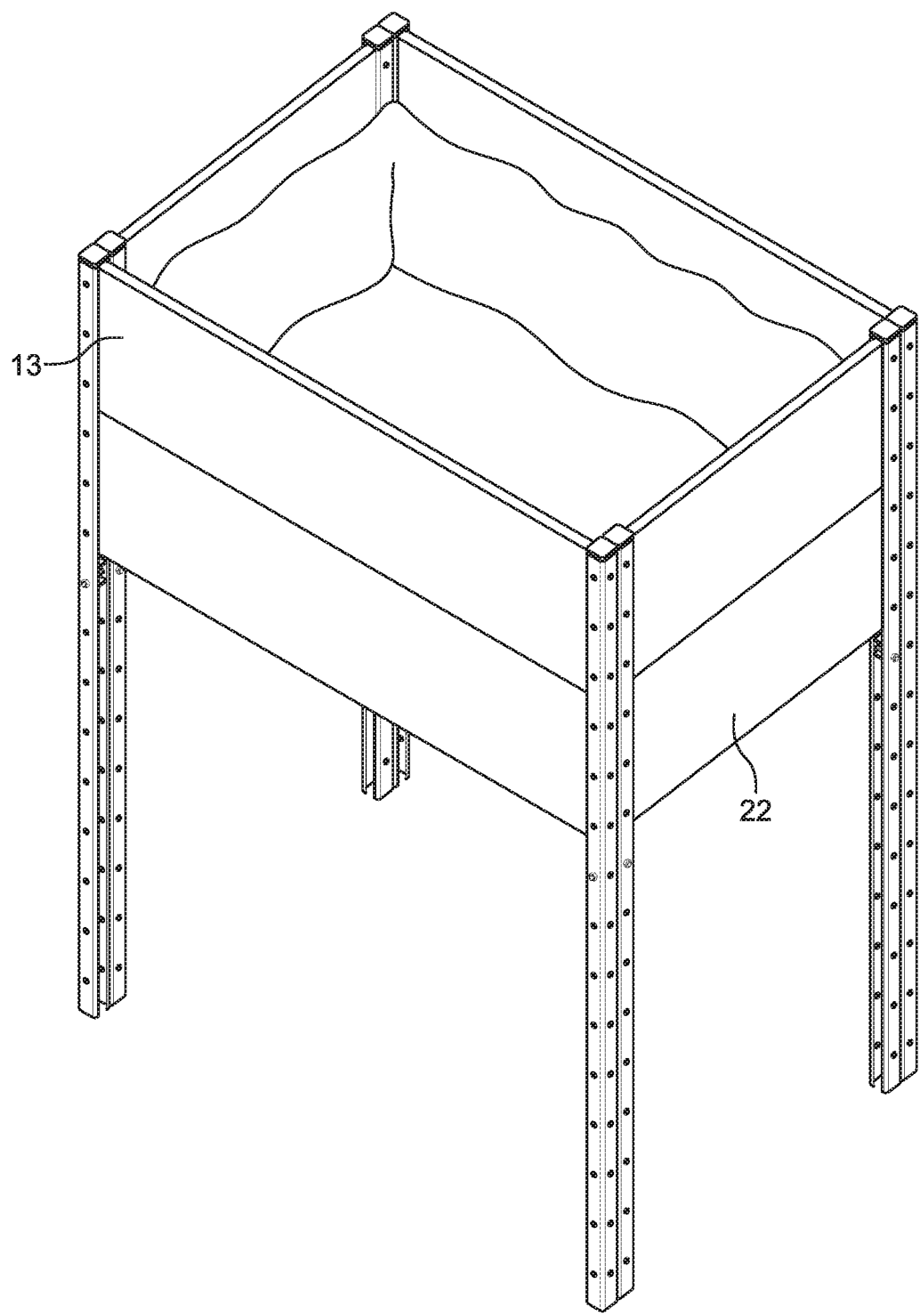
FIG. 15 is a slightly elevated perspective view of an elevated garden bed showing soil disposed in the garden bed.

FIG. 15 shows an elevated garden bed with soil disposed in the cavity defined by the slotted boards [22], floor boards (not visible) [23] and boards [13]. In this embodiment, boards [13] are disposed above the slotted board [22].

Figure 16:
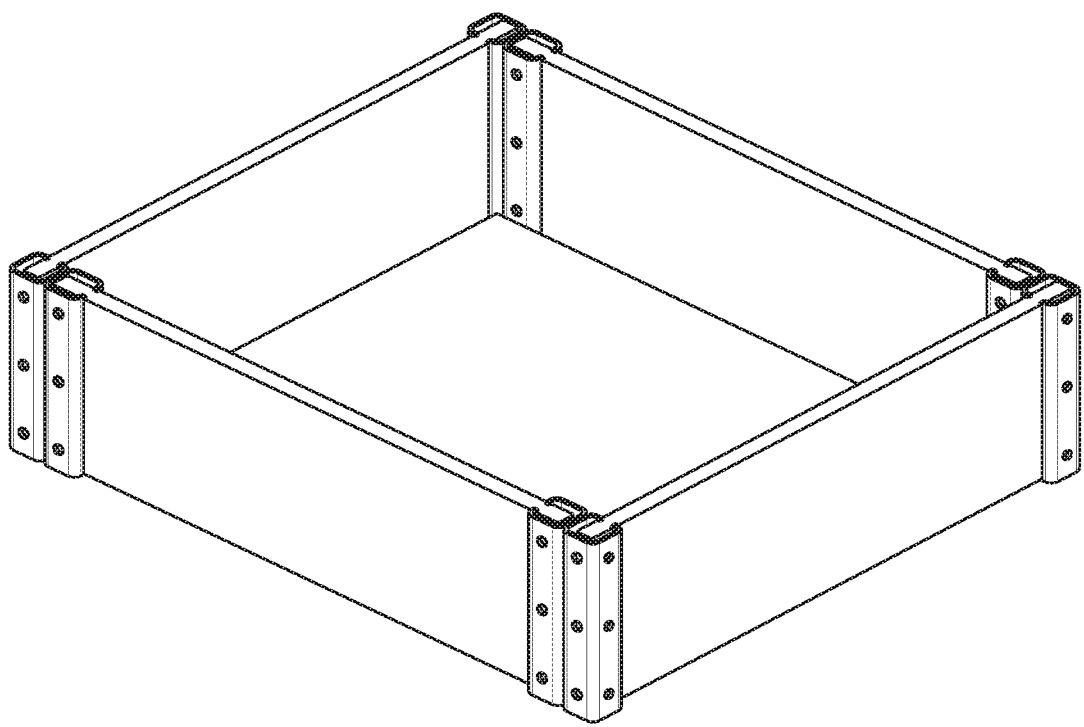
FIG. 16 is a perspective view of a raised garden bed.

FIG. 16 shows an embodiment raised garden bed, without a securing screw or bolt.

Figure 17:
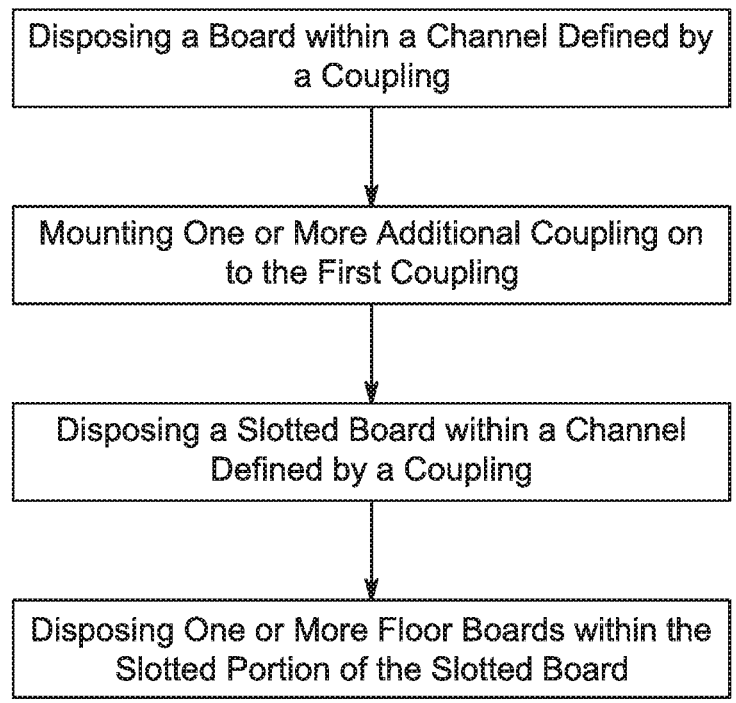
FIG. 17 is a flow diagram illustrating an example method.

FIG. 17 shows the example method of disposing a board within the channel defined by the coupling. Multiple couplings may be mounted together such that garden beds or other containers or different heights, and sizes may be assembled. A board with a slot may also be disposed within the cavity of the coupling. Floor boards are disposed within the slotted portion of the slotted board to form the floor of a garden bed.

Figure 18:
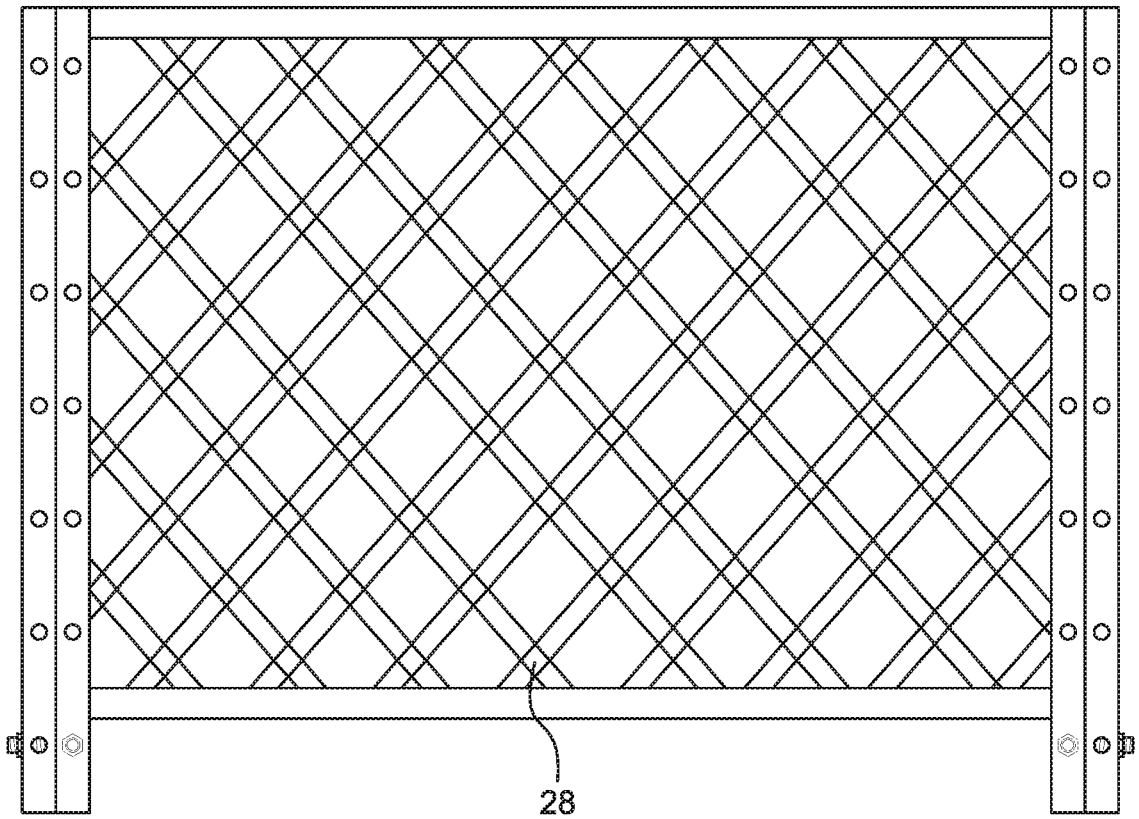
FIG. 18 is a perspective view with a fence disposed in the coupling.

FIG. 18 shows an example embodiment wherein a fence [29] is disposed within the cavity [6]. In this example embodiment, a fence [29] is shown in a lattice pattern disposed in the cavity [6]. In this example embodiment, additional supports will be disposed between the connectors to provide support for the fence. Such additional support will have a U-shaped profile to fit on top of the fence to secure it.

What is claimed is:

1. A system comprising:
   an article comprising:
   one or more coupling comprising a first side wall, a back wall integrally molded to the first side wall, and a second side wall integrally molded to the back wall, wherein the first side wall and second side wall are substantially parallel, each of said first side wall and second side wall including a lip protruding inwardly,
   wherein the first side wall, back wall, and second side wall define a cavity,
   wherein a plurality of sets of mounting holes are disposed along at least two of the first side wall, back wall, and second side wall, and wherein each set of mounting holes of the plurality of sets of mounting holes is equidistant from a first end of the one or more coupling; and
   at least one board disposed in the cavity between the lip of the one or more coupling, wherein the board has at least one groove on each side, and wherein the lips of the first and second side walls of the one or more coupling protrude inwardly to engage and secure the board within the one or more coupling.

2. The article of claim 1, wherein each mounting hole has the same shape.

3. The article of claim 1, wherein each set of mounting holes comprises at least two mounting holes, such that a first mounting hole is disposed in one of the first side wall, back wall, or second side wall, and a second mounting hole is disposed in another of the first side wall, back wall, or second side wall in which the first mounting hole is not disposed.

4. The article of claim 1, wherein each set of mounting holes comprises three mounting holes, such that the first mounting hole is disposed in the first side wall, the second mounting hole is disposed in the back wall, and a third mounting hole is disposed in the second side wall.

5. The article of claim 1, wherein a first curved joint connects the first side wall to the back wall, a second curved joint connects the back wall to the second side wall, the lip of the first side wall is rounded, and the lip of the second side wall is rounded.

6. The article of claim 1, wherein each of the first side wall, back wall, and second side wall is the same width.

7. The article of claim 1, wherein the one or more coupling is substantially square in its transverse cross-section.

8. The article of claim 1, wherein each mounting hole is positioned in the center of the width of the respective first side wall, back wall, or second side wall.

9. The article of claim 1, wherein each set of mounting holes comprises three mounting holes, such that a first mounting hole is disposed in the first side wall, a second mounting hole is disposed in the back wall, and a third mounting hole is disposed in the second side wall,
   wherein each set of mounting holes is equidistant from a first end of the one or more coupling,
   wherein the width of each of the first side wall, back wall, and second side wall is the same, and
   wherein each mounting hole is positioned in the center of the width of the respective first side wall, back wall, and second side wall.

10. A method comprising:
    disposing a board within a cavity of a first coupling of a plurality of coupling, the first coupling including a first side wall, a back wall integrally molded to the first side wall, and a second side wall integrally molded to the back wall, wherein the first side wall and second side wall are substantially parallel, said first side wall and second side wall including a lip protruding inwardly,
    wherein the first side wall, back wall, and second side wall define the cavity, wherein at least two of the first side wall, back wall, and second side wall include a plurality of mounting holes, and wherein each set of mounting holes of the plurality of mounting holes is equidistant from a first end of the first coupling; and
    mounting a second coupling of the plurality of coupling to the first coupling, wherein the second coupling comprises a first side wall, a back wall integrally molded to the first side wall, and a second side wall integrally molded to the back wall, wherein the first side wall and second side wall of the second coupling are substantially parallel, each of said first side wall and second side wall of the second coupling including a lip protruding inwardly, wherein the first side wall, back wall, and second side wall of the second coupling define a cavity within the second coupling, wherein one or more mounting holes of the first coupling align with one or more mounting holes of the second coupling, wherein the board is disposed in the cavity between the lips of the first or second coupling, wherein the board has at least one groove on each side, and wherein the lips of the first and second side walls of the first or second coupling protrude inwardly to engage and secure the board within the first or second coupling.

11. The method of claim 10 further comprising a step of mounting a third coupling of the plurality of coupling to the first or second coupling, wherein the third coupling comprises a first side wall, a back wall integrally molded to the first side wall, and a second side wall integrally molded to the back wall, wherein the first side wall and second side wall of the third coupling are substantially parallel, each of said first side wall and second side wall of the third coupling including a lip protruding inwardly, wherein the first side wall, back wall, and second side wall of the third coupling define a cavity within the third coupling, and wherein one or more mounting holes of the third coupling align with one or more mounting holes of the first or second coupling.

12. A system comprising:
a plurality of couplings, the plurality of couplings having:
a first coupling comprising a first side wall, a back wall integrally molded to the first side wall, and a second side wall integrally molded to the back wall, wherein the first side wall and second side wall are substantially parallel, each of said first side wall and second side wall including a lip protruding inwardly, wherein the first side wall, back wall, and second side wall define a cavity, and wherein at least two of the first side wall, back wall, and second side wall include a plurality of mounting holes,
a second coupling mounted to the first coupling, said second coupling including a plurality of mounting holes on at least two of a first side wall, a back wall, and a second side wall of the second coupling, each of said first side wall and second side wall of the second coupling including a lip protruding inwardly, and wherein one or more mounting holes of the first coupling align with one or more mounting holes of the second coupling; and
at least one board disposed in the cavity between the lips of the first or second coupling, wherein the board has at least one groove on each side, and wherein the lips of the first and second side walls of the first or second coupling protrude inwardly to engage and secure the board within the first or second coupling.

13. The system of claim 12, wherein the first side wall of the first coupling is mounted on the back wall of the second coupling.

14. The system of claim 12, wherein the back wall of the first coupling is mounted on the back wall of the second coupling.

15. The system of claim 12, wherein the first coupling and second coupling are of different heights.

16. The system of claim 12, wherein the plurality of couplings further comprising a third coupling that is mounted to the first or second coupling, wherein the third coupling includes a plurality of mounting holes on at least two of a first side wall, a back wall, and a second side wall, each of said first side wall and second side wall including a lip protruding inwardly, and wherein one or more mounting holes of the third coupling aligns with one or more mounting holes of the first or second coupling.

17. The system of claim 12, the system further comprising at least one of an apparatus or accessory, wherein the apparatus or accessory is mounted to the first or second coupling by a securing mechanism that extends through one or more mounting holes, a portion of said securing mechanism being disposed within a gap between the board and one of the first side wall, second side wall, or back wall.

18. The article of claim 2, wherein the mounting holes are circular.

19. The system of claim 16, wherein the back wall of the first coupling is mounted on the first side wall of the second coupling and the back wall of the third coupling is mounted on the second side wall of the second coupling.

20. A system comprising:
an article comprising:
one of the more coupling comprising a first side wall, a back wall integrally molded to the first side wall, and a second side wall integrally molded to the back wall, wherein the first side wall and second side wall are substantially parallel, each of said first side wall and second side wall including a lip protruding inwardly,
wherein the first side wall, back wall, and second side wall define a cavity; and
at least one board disposed in the cavity between to lip of the one or more coupling, wherein the board has at least one groove on each side, and wherein the lips of the first and second side walls of the one or more coupling protrude inwardly to engage and secure the board within the one or more coupling.

21. A method comprising:
disposing a board within a cavity of one or more coupling, the one or more coupling including a first side wall, a back wall integrally molded to the first side wall, and a second side wall integrally molded to the back wall, wherein the first side wall and second side wall are substantially parallel, each of said first side wall and second side wall including a lip protruding inwardly, wherein the first side wall, back wall, and second side wall define the cavity,
wherein the board is disposed in the cavity between the lip of one or more coupling, wherein the board has at least one groove on each side, and wherein the lips of the first and second side walls of the one or more coupling protrude inwardly to engage and secure the board within the one or more coupling.

\* \* \* \* \*